Aug. 21, 1951  W. O. HEBLER  2,565,230
GAS ANALYSIS APPARATUS
Filed Jan. 26, 1946
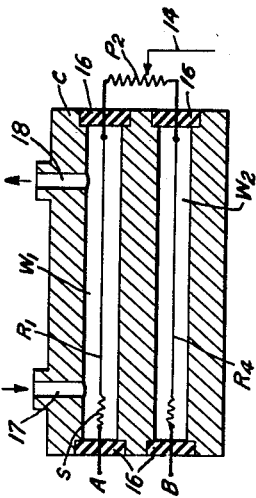
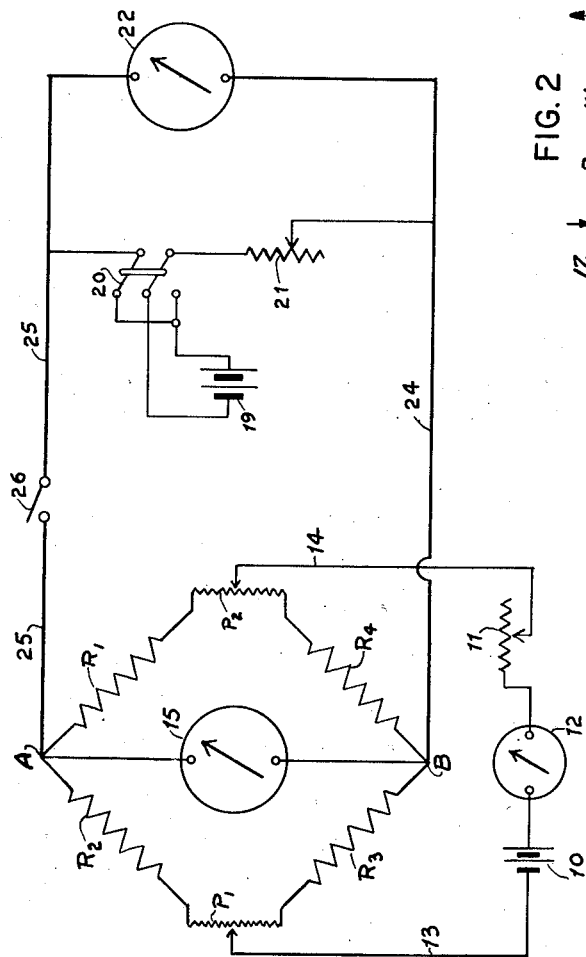
INVENTOR
WILLIAM O. HEBLER
BY
ATTORNEY Patented Aug. 21, 1951

2,565,230

UNITED STATES PATENT OFFICE 2,565,230

GAS ANALYSIS APPARATUS

William O. Hebler, Westfield, N. J.

Application January 26, 1946, Serial No. 643,771

2 Claims. (Cl. 73—27)

1

This invention relates to gas analysis and detecting apparatus, more particularly to such apparatus which is electrically operated and embodies a resistance bridge network of the Wheatstone type.

Two well known types of such instruments are the thermal conductivity type and the combustion type. In instruments of both types the gas to be analyzed, or air in which gas is to be detected, is passed through or diffused into a cell or cells containing a heated filament or filaments which constitute one or more of the resistance elements of the bridge network. One class of instrument provides indications, on a suitable electrical meter, resulting from variations in the thermal conductivity of the test cell or cells containing the heated filament or filaments, due to the presence of the gas being tested. Change in thermal conductivity changes the temperature of the filament in the test cell and hence its resistance, which unbalances the bridge and gives a reading on the meter. The other class of instrument, generally used to detect combustible gases in air, operates on the principle of oxidation of the combustible gas by contact with the heated filament, such oxidation or burning of the gas again serving to change the temperature of the filament and its resistance and so to unbalance the bridge, giving an indication on the meter. Suitable calibrations on the meter indicate the conditions in the test cell.

Gas analysis apparatus of the types described are of extreme industrial importance in the control of chemical processes, combustion control, in the detection of explosion hazards, and in the detection of atmospheres unsafe for human habitation. Since it is a prime requirement that the indications given by the instrument be accurate, since very small changes in gas compositions are frequently of critical importance, and since the instruments are by their nature extremely delicate, it is essential that they be readily adapted for frequent and accurate checking to determine that the normal or zero setting of the instrument is accurate before readings are taken.

It will be understood by those familiar with the art that there are included in the Wheatstone bridge network one or two test cells into which the gas to be analyzed passes, which cells each contain a resistance element of the bridge network. In instruments of both the thermal conductivity and combustion types it is common to employ in the bridge both test cells and reference cells which are subjected to the same ambient conditions except for contact with the gas being analyzed.

2

Heretofore it has been necessary to have available for checking gas analyzers, either a supply of pure air or pure gas, or gas of some known standard admixture, or some chemical equivalent thereof, which could be passed through the test cell or cells. This has been a great disadvantage for several reasons. If air is required for checking, pure air may not be available or the purity may be questionable. If gas is required, it necessitates keeping a supply on hand and having it available where the instrument is located. In either case it is necessary to flush out of the test cell or cells whatever they may contain and flow in the pure air or gas. This operation takes time and requires disconnecting the test cells from the sampling lines and connecting them to the source of pure air or gas, after which the original connections must be restored. Valves may be provided for doing this but even so the purging and refilling operations require a substantial time, during which undetected hazardous conditions may develop with resulting accidents or other undesired conditions may develop without detection.

Another disadvantage of prior art gas analyzers of the thermal conductivity type is that certain instruments in this category have utilized reference cells in which a standard gas has been sealed up. For a consideration of this type of device see Krueger et al. Patent 1,860,544 which proposes a way of overcoming the inherent difficulty of maintaining the gas in the reference cell constant by substituting therefor a liquid or solid material having equivalent thermal conductivity characteristics. The present invention eliminates the necessity of sealing up a reference gas or an equivalent material in this type of analyzer.

The objects of this invention are:

(a) To provide an electrical gas analyzer which can be instantaneously checked without purging the test cells and regardless of the gas content of the test cells.

(b) To eliminate the hazards attendant upon incapacitating the analyzer for checking purposes.

(c) To eliminate the need for having a supply of pure air or standard gas for checking purposes.

(d) To provide a thermal conductivity type of analyzer in which there need not be any standard gas or equivalent material sealed up in a reference cell.

(e) To provide an analyzer which is readily adapted to recalibration for various gas analysis problems.

(f) To provide a gas analyzer in which the potential impressed on the meter by the unbalancing of a Wheatstone bridge may be selectively nullified by an electrical potential of opposite sign supplied from a source extraneous to said bridge.

Other objects and advantages will in part appear and in part will be obvious from the following detailed description, taken in conjunction with the drawing in which Fig. 1 shows a circuit diagram of an analyzer representing the present preferred embodiment of the invention and Fig. 2 shows one form of construction of test and reference cells and their relation to the circuit of Fig. 1.

Referring to the drawing, a typical Wheatstone bridge circuit is shown having resistance elements $R_1$, $R_2$, $R_3$ and $R_4$. An adjustable source of potential for the bridge is provided by battery 10 and an adjustable resistance 11, a meter 12 being inserted in the battery circuit by means of which the current supplied to the bridge can be adjusted to the desired value. The battery circuit is connected to the bridge by leads 13 and 14 through resistances $P_1$ and $P_2$ by which the bridge can be balanced so that no current flows across the bridge through the meter 15.

According to the type of gas analyzer employing this bridge circuit, one or more of the resistors constituting the bridge, such as $R_1$, will be in the form of a heated filament, having a high temperature coefficient of resistance, arranged to be subjected to the gas to be analyzed. For example, in an instrument of the thermal conductivity type the resistors may all be in the form of filaments mounted in wells drilled or cast into a block of material which preferably has high thermal conductivity, for example as described in my patent No. 2,269,850, issued Jan. 13, 1942. The usual arrangement is to have alternate arms of the bridge, such as $R_1$ and $R_3$, open to the flow of gas to be analyzed, and the other two arms, $R_2$ and $R_4$, being sealed in their wells and surrounded by air, or a standard gas of known composition or a substance which is its thermal equivalent. Fig. 2 shows a cross-section through a block C of heat conducting material in which are wells $W_1$ and $W_2$ closed at their ends by insulating plugs 16 which carry filaments constituting the resistances $R_1$ and $R_4$. Well $W_1$ is provided with inlet and outlet openings 17 and 18 for the gas to be analyzed and is the "test" cell. Well $W_2$ is completely sealed and is the "reference" cell. Resistances $R_2$ and $R_3$ may also be in the form of filaments located in similar wells in the same block C constituting a second test cell and a second reference cell. The filaments may be in the form of coils attached to suitable supports or straight filaments as shown held under tension between supports by means of coil springs s as shown in the drawing.

This instrument, as thus far described, may be used for analysis by balancing the bridge with resistances $P_1$ and $P_2$ so that no current flows through meter 15, calibrating the meter by means of a known mixture of air and gas or a known mixture of gases, and thereafter passing the gas or air to be analyzed through the test cells containing resistors $R_1$ and $R_3$.

It will be understood that the gas analyzer may also be constructed with a single reference cell and a single test cell, constituting two legs of the bridge, and two fixed resistors constituting the other two legs. In this case the test cell and reference cell are arranged to be subjected to the same ambient conditions and the gas to be analyzed is passed through or diffused into the single test cell. Referring to the drawing, $R_1$ may represent the test cell, $R_2$ the reference cell, $R_3$ and $R_4$ being fixed resistors. Both thermal conductivity and combustion types of analyzers may be so constructed. The analyzer operates to indicate gas conditions in the same manner as an analyzer in which the test and reference cells constitute all four legs of the Wheatstone bridge.

In accordance with the present invention there is added to a gas analyzer embodying a bridge network of the Wheatstone type an extraneous source of electrical potential adapted to nullify any current flowing across the bridge by reason of changes in the bridge resistances in the test cell or cells during analysis.

Referring to the drawing, the current to be nullified is that flowing through meter 15. The extraneous potential circuit is therefore connected to the bridge at the same points as is meter 15. This circuit, as shown, comprises a source of potential such as battery 19, a pole changer 20, variable resistance 21, a suitable meter 22 such as a millivoltmeter to show the extraneous circuit potential, leads 24 and 25 for delivering the potential to the bridge at the junction points A and B where meter 15 is connected, and a switch 26 by which the extraneous potential circuit may be connected to and disconnected from the bridge. It is to be understood that the direction of current flow in the extraneous circuit will be the opposite of that across the bridge between the points A and B. The direction of flow may be controlled by the pole changer 20.

The utility of this extraneous potential circuit in conjunction with the bridge network in a gas analyzer resides in two separate aspects which will now be described by reference to examples illustrating how it may be used.

First, the extraneous potential circuit may be used to check the balance of the bridge without purging the test cell or cells of air or gas undergoing analysis, thus making it possible to make instantaneous checks and eliminating the necessity of having a supply of pure air or gas of known composition for checking purposes.

It will be understood that meter 15 is calibrated in the usual manner, in accordance with the use to which the analyzer is to be put, so that its scale gives the desired information, in terms of the concentration of some specific gas. Meter 22 is provided with a scale graduated in the same terms and is calibrated together with meter 15. This is done by determining, for any given reading on meter 15, what potential from the extraneous circuit is required to make meter 15 return to zero. When the scales on meters 15 and 22 have thus been interrelated, it becomes possible, through adjustment of resistance 21, selectively to produce in the extraneous potential circuit a potential which bears a known equivalency to the potential developed across the bridge, through meter 15, as a result of any given gas condition existing in the test cell or cells.

The purpose of checking the reading of meter 15 is to determine whether it accurately represents the condition in the test cell or cells. This it will do if the bridge network is balanced to zero under the conditions assumed as normal in designing the analyzer. Let it now be supposed that meter 15 gives a reading of 2% gas under a given set of conditions. To check this indication resistance 21 is adjusted, with switch 26 open, to give a reading of 2% gas on meter 22. Switch 26 is then closed and meter 15 should return to zero. If it does, the initial indication of 2% is known to be correct. If it does not, it shows that the bridge requires rebalancing and this can be done merely by adjusting resistances $P_1$ and $P_2$ until meter 15 reads zero. Upon opening switch 26, meter 15 will again indicate the gas percentage, which will be known to be an accurate reading.

In some applications it may be possible to dispense with meter 22 if suitable indications are provided on the adjusting member of resistance 21 to take the place of the scale on meter 22. Under these conditions the potential of battery 9, would, of course, have to be of known value.

In its second aspect, the invention may be utilized, in a thermal conductivtiy type of gas analyzer, to eliminate the necessity of sealing a reference gas or other material of equivalent thermal conductivity in the reference cell or cells and at the same time to make it unnecessary to have a standard gas for checking the balance of the bridge.

Assume, for example, that a thermal conductivity gas analyzer is provided with a meter 15 across the bridge calibrated to read from 0% to 5% oxygen inclusion in hydrogen. At present such an analyzer requires that pure hydrogen or some thermal equivalent, as taught, for example, in Krueger et al. Patent 1,860,544, be sealed into the reference cells. With such an analyzer pure hydrogen must also be used in the test cells to balance the bridge. Now by adding to such an analyzer the extraneous potential circuit of the invention both of these requirements are obviated. The reference cell or cells may be filled with air, which does away with the difficulties of sealing in other materials liable to be lost by diffusion or leakage, with resulting instability. The bridge may thus be balanced with air in all cells, and the air need not be pure air if admitted from the same supply into all cells, so as to be the same in each. Balancing is done by adjustment of the bridge until meter 15 reads zero. Pure hydrogen is then passed through the test cell or cells and meter 15 is calibrated so as to read on the last or 5% graduation. Subsequently the use of pure hydrogen is not required. Switch 26 is then closed and resistance 21 is adjusted so that the extraneous circuit delivers into the bridge a potential opposing in direction the current flow through meter 15 and of such magnitude as to cause meter 15 to return to zero. This potential, as measured on meter 22, with switch 26 open, determines the 5% indication to be marked on meter 22 for subsequent use in making analyses.

Testing of the purity of hydrogen gas by means of such an analyzer is done as follows: The bridge is balanced on air only so that meter 15 reads zero, with switch 26 open. The extraneous circuit is then adjusted by resistance 21 to deliver a potential indicated on meter 22 as "5%." Switch 26 is then closed, causing the pointer of meter 15, of course, to deflect negatively because of the impressed potential. (This potential has the same effect on the bridge as would be produced by sealing pure hydrogen into the reference cell or cells.) The hydrogen to be analyzed is then passed into the test cell or cells and meter 15 will read zero only when the hydrogen is 100% pure. Any departure from zero indicates impure hydrogen. Suitable indicia on meter 22 can be provided to show the percentage of impurity. If this information is desired, resistance 21 would be adjusted with switch 26 closed until meter 15 reads zero, switch 26 would then be opened and the percentage of impurity read on meter 22. If only an indication of purity is desired, switch 26 would normally be left closed. This is in contrast to the checking aspect of the invention described above in which the switch 26 is normally open and closed only for checking.

The foregoing specific examples of how the extraneous potential circuit is to be used and the specific circuit illustrated are to be taken as merely illustrative of the invention, which is not to be limited thereto but construed broadly within the purview of the claims.

What is claimed is:

1. The method of operating a Wheatstone bridge thermal conductivity type of gas analyzer having test and reference cells and adapted for zero balance of the bridge with pure samples of the gas undergoing test in both the test and reference cells, without having to maintain a body of said gas in the reference cells, which comprises filling said reference cells with air, applying across said bridge a potential of opposite sign to and known to be the equivalent of the potential developed across the bridge by the presence of air in the reference cells and a pure sample of the gas to be tested in the test cells, and introducing gas to be tested into said test cells.

2. In a gas analyzer having a resistance bridge network of the Wheatstone type containing test and reference cells, a meter connected across the bridge adapted to indicate test cell gas conditions affecting the balance of the bridge, an extraneous potential circuit comprising a source of potential, an adjustable resistor in series with said source, a meter in said circuit to indicate the adjusted potential of said source, both of said meters having corresponding scales bearing indicia correlated to the degree of unbalance of the bridge under varying gas conditions in said test cell, and means for connecting said circuit at will across the bridge to apply said potential in a direction opposed to the direction of current flow through said instrument under gas analyzing conditions to change the deflection shown by said instrument by a predetermined amount, whereby the bridge may be balanced or the balance of the bridge may be checked by reference to the reading of said deflection instrument without altering the existing conditions in said cells.

WILLIAM O. HEBLER.

REFERENCES CITED

The following references are of record in the file of this patent:

UNITED STATES PATENTS

| Number | Name | Date |
|--------|------|------|
| 1,379,266 | Keeler | Mar. 24, 1921 |
| 1,665,397 | Wunsch | Apr. 10, 1928 |
| 1,912,242 | Albert | May 30, 1933 |
| 2,302,036 | Keeler | Nov. 17, 1942 |

OTHER REFERENCES

Bureau of Standards Publication No. 249, "Thermal Conductivity Method for the Analysis of Gases"; January 7, 1924.